INVENTOR
JEAN FRANCOIS MARCHAND

BY Frank R Trifari
AGENT

United States Patent Office 3,131,380

Patented Apr. 28, 1964

3,131,380
MAGNETIC CORE STORAGE WITH DYNAMIC READ-OUT

Jean Francois Marchand, Eindhoven, Netherlands, assignor to North American Philips Company, Inc., New York, N.Y., a corporation of Delaware Filed May 9, 1958, Ser. No. 734,157
Claims priority, application Netherlands June 21, 1957
9 Claims. (Cl. 340—174)

Figure 1:

The present invention relates to magnetic trigger circuit arrangements, more especially but not exclusively to dynamic storage circuit arrangements.

Such arrangements may, for example, be used in electronic computers or circuit arrangements for automatic telephony for temporarily storing information in binary code.

Magnetic trigger circuit arrangements are known, which comprise means for alternately producing voltage pulses of opposite polarity, the pulses of one polarity being supplied to a series-combination of two windings coupled to a first core and to a second core respectively, the cores being composed of magnetic material having a rectangular hysteresis loop. The impedance of this series-combination is determined principally by the winding on the first core; when supplying a pulse to the series-combination, the current through the winding on the second core will depend on the remanence condition of the first core: the current will remain below the critical value required for making the second core change its magnetic remanence condition, if the first core is in a magnetic remanence condition in which it changes its remanence condition by the action of the pulse itself, while the current through the winding on the second core exceeds said critical value if the first core is in the opposite remanence condition in which it is driven further into saturation by the pulse.

In this known circuit arrangement, the pulses of the other polarity are supplied only to a winding on the second core, and provision is made of a coupling circuit between the two cores so that the circuit reassumes the same state after two pulses of the same polarity. Consequently, this circuit arrangement may be employed as a frequency-division circuit for use in pulse-counting circuit-arrangements. However, the circuit arrangement has no storage effect, since invariably the same cycle of condition reversal is followed.

The present invention provides a trigger circuit arrangement which may be used as a storage element. In the circuit arrangement according to the invention, the pulses of the other polarity are likewise supplied to a series-combination of two windings on the cores, the impedance in this circuit relative to the pulses of the other polarity being determined, in a similar manner, principally by the winding on the second core. In other words the current through the winding on the first core can exceed the critical value only when the second core is further driven into saturation by the pulses. Further, provision is made of means for bringing the cores into a relatively unidirectional magnetic initial state in either direction. According to the direction of the initial state a cycle is followed under the control of pulses of opposite polarity, during which cycle the first core changes its state continuously and the second core remains in the same state, or a cycle during which the first core remains in the same state and the second core changes its state continuously.

Principally, the direction of the positive magnetization may be chosen at will, since the hysteresis loop is symmetrical. The term relative unidirectional magnetic state of the cores is, however, to be understood to mean in particular the state assumed by the cores if a sufficiently strong pulse is supplied to a series-combination of the windings. Such an unidirectional magnetic state may consequently either be positive or negative. Output pulses, which are characteristic for the ruling cycle of condition reversal, can be taken from a circuit coupled to at least one of the cores.

Figure 2:
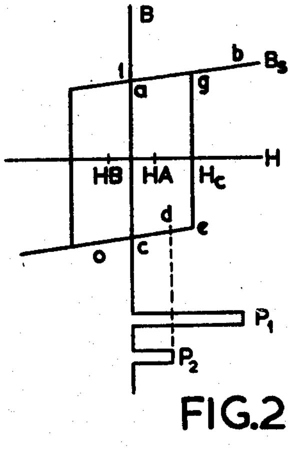
Figure 3:
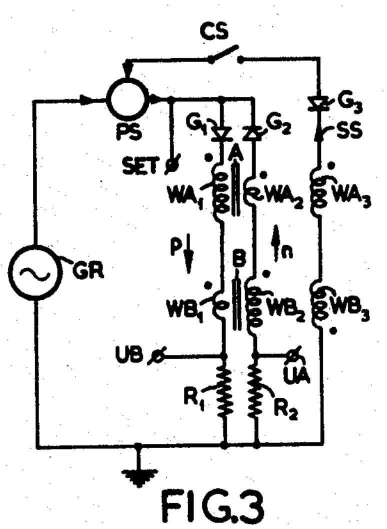
Figure 4A:
Figure 4B:
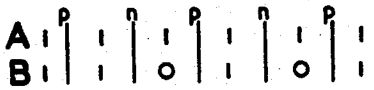
Figure 5:
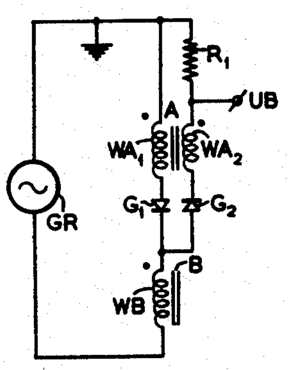
Figure 6:
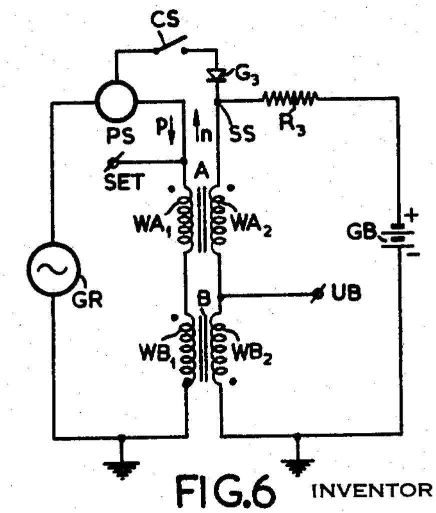

In order that the invention may be readily carried into effect, examples will now be described in detail with reference to the accompanying drawing, in which FIG. 1 shows the series-combination of two windings, FIG. 2 illustrates an idealized example of a rectangular hysteresis loop, FIGS. 3, 5 and 6 show dynamic storage circuit arrangements, and FIGS. 4*a* and 4*b* relate to tables for explaining the operation of these circuit arrangements.

FIG. 1 shows a series-combination of two windings WA and WB on cores A and B of magnetic material having a rectangular hysteresis loop, as idealized in FIG. 2. Each core is adapted to assume two different states of remanence 1 and 0. The number of turns of the winding WA exceeds that of the winding WB. Means not further indicated permit voltage pulses to be supplied to the series-combination, as indicated by the arrow P. If the core A is in the state 1, the material of this core is further driven into magnetic saturation under the control of a pulse, the branch *a—b—a* of the hysteresis loop being followed. Since the saturation induction $Bs$ differs only slightly from the remanence value in the state 1, the effective permeability during the pulse is substantially unity so that the impedance of the winding WA has a comparatively low value and substantially corresponds to the direct current resistance. The current through the series-combination may then rise to such a value as to exceed the critical field strength $Hc$ in the core B. If the core B were in the state 0, this state is consequently changed over to the state 1, in which the branch of the hysteresis loop *c—d—e—f—g—b—g—a* is followed. Should the core B be in the state 1, it naturally remains in this state. Should the core A be in the state 0, it is changed over by the pulse to the state 1, the branch *c—d—e—f—g—b—g—a* of the hysteresis loop then being followed. Since, in this case, a comparatively considerable variation of the magnetic induction B occurs, the effective permeability of the core A is fairly considerable and the winding on the core then has a comparatively high impedance so that the current through the winding WB is allowed to assume only a value smaller than the value corresponding to the critical field strength $Hc$; the pulse P is divided among the windings WA and WB, the major part P1 occurring across the winding WA and the smaller part P2 across the winding WB. The magnetization in the core B then follows the branch *c—d—c* of the hysteresis loop if the core B would have been in the state 0. Consequently, the core B then remains in the state 0. If the core B were in the state 1, it naturally would remain in the state 1.

Referring now to FIG. 3, the dynamic trigger circuit arrangement is fed, through the gate circuit PS, which is normally conductive, with the alternating voltage from a generator GR, the frequency of which may, for example, be 1 mc./s. During the positive periods, the generator supplies positive pulses through the gate circuit PS to the series-combination of rectifier G1, windings WA1 and WB1 on cores A, B, and the resistor R1, as indicated by the arrow *p*. During the negative periods, the generator GR supplies, through the gate circuit PS, negative pulses to the series-combination of rectifier G2, windings WA2 and WB2 on cores A, B and the resistor R2, as indicated by the arrow *n*. The winding WA1 has more turns than has the winding WB1, and the winding WB2 has more turns than has the winding WA2. The dots at the winding designate in the usual way the winding ends to which the positive current has to be supplied to make the associated cores assume the state 1.

The operation of this circuit arrangement is as follows. As will be seen from the following, the trigger circuit arrangement is adapted to be driven into two different series of state reversals by the generator circuit GR. In one series of state reversals, termed "cycle" A and shown in FIG. 4*a*, the core A changes its state continuously, whereas the core B invariably remains in the state 0. In the other series of state reversals, termed "cycle B" and shown in FIG. 4*b*, the core B changes its state continuously and the core A remains in the state 1. The cores A and B may be made to assume the state 0 by applying a strong negative pulse to the control terminal SET. If the next pulse from the generator GR happens to be a negative pulse n, the circuit remains in this state, since the pulse exactly tends to drive the cores A and B into the state 0. On the next positive pulse p the core A changes over to the state 1, thus establishing the state 1—0, as shown in FIG. 4*a*. Although the pulse has such a polarity as to urge the core B to assume the state 1, the core B remains in the state 0, since the winding WA1 has a comparatively high impedance during reversal of the core A, as a result of which the current through the series-combination of the windings WA1 and WB1 is restricted to a low value. On the next negative pulse n which drives the core B further into saturation, the impedance of the winding WB2 is comparatively low, so that the current through the winding WA2 assumes such a value that the core A reassumes the state 0, and the initial state is reassumed. The next positive pulse p again urges the circuit to the state 1—0 and so on. Since, in the cycle A, the core A changes its state continuously, so that the winding WA1 has a high impedance, the current through the resistor R1 can reach only a low value and only weak pulses will appear at the output terminal UB. Contrary thereto, comparatively strong current pulses occur in the series-combination WA2, WB2 and the resistor R2, as a result of which comparatively strong voltage pulses appear at the output terminal UA, which is characteristic for the cycle A. The trigger circuit can be caused to assume the state 1—1 for following the cycle B by supplying a strong positive pulse to the control terminal SET. If the next pulse from the generator GR happens to be a positive pulse the circuit remains in this state, since the pulse drives the cores A and B in the direction of positive saturation. Upon the next negative pulse n the core B changes over to the state 0, in which the winding WB2 has a comparatively high impedance and the current through the winding WA2 is restricted so as to prevent the core A from changing its state. On the next positive pulse p the core A remains in the state 1 and the winding WA1 has a low impedance so that the current through the winding WB1 drives the core B to the state 1. Thus reaching the initial state is assumed. The process is repeated and on each negative pulse the core B changes over to the state 0 and reassumes the state 1 upon each positive pulse. During the cycle B, comparatively strong output pulses appear at the output terminal UB. Instead of providing series-resistors R1 and R2 for obtaining output pulses, auxiliary windings (not shown) may alternatively be provided on the cores A and B, in which case comparatively strong pulses can be taken from the auxiliary winding on the core A in the cycle A, and from the auxiliary winding on the core B in the cycle B. The trigger circuit as described may advantageously be used as a storage circuit for use in electronic computers or in automatic telephony exchanges. The trigger circuit arrangement, similarly as the dynamic storage circuits to be described with reference to FIGURE 6, has the advantage that the generator GR can be disconnected for any length of time without the information being lost.

For this purpose, the cores A and B comprise a third winding WA3 and WB3 connected in series-opposition. When the core A in the cycle A passes over to the state 0, or the core B in the cycle B is passed over to the state 1, a negative pulse appears at the point SS. If, for economizing current, the supply of pulses is to be interrupted for some time, the contact CS is closed so that the negative pulses are supplied to the bi-stable gate circuit PS through rectifier G3 and contact CS, this gate circuit PS subsequently interrupting the supply of pulses and the generator circuit may, if desired, be disconnected. The trigger circuit is then in the state 0—0 when following the cycle A, or in the state 1—1 when following the cycle B.

From the foregoing it is seen that, if the generator GR is again connected, the trigger circuit is again driven into the cycle A and B respectively, independently of the polarity of the first pulse of the generator GR.

In the trigger circuit arrangement shown in FIG. 5, the windings WA1 and WA2 on the core A are connected, through rectifiers G1 and G2, in series with the winding WB on the core B. The number of turns of the winding WB is smaller than that of the winding WA1 but exceeds that of the winding WA2. The operation of this circuit is analogous to that shown in FIG. 3 and the arrangement may likewise be driven according to a cycle A or a cycle B. In the last-mentioned case, comparatively strong pulses can be taken from the output terminal UB.

In the trigger circuit arrangement shown in FIG. 6, the windings WA1 and WB1, then having an equal number of turns, are connected to the generator GR through the gate circuit PS which is normally assumed to be conductive. By means of a direct current delivered by the direct current supply GB and passing through the resistor R3 and the series-opposition connected windings WA2 and WB2 on the cores A and B, the cores A and B are further pre-polarized in positive and negative direction respectively, the direct current having such a value that the prepolarizing fields HA and HB (FIG. 2) do not exceed the critical field strength HC. The windings WA1 and WB1 are so connected that the positive pulses p tend to drive the cores A and B in the direction 1, the negative pulses n conversely in the direction 0. The cores A and B can be urged to the state 0 for following the cycle A by supplying a strong negative pulse to the control terminal SET. If the next pulse from the generator GR were negative, the circuit arrangement naturally remains in the state 0—0. Upon the next positive pulse p the core A passes over to the state 1. Although this pulse tends to urge also the core B to the state 1, and the number of turns of the windings WA1 and WB1 is the same, the core B yet remains in the state 0, since the cores A and B are pre-polarized in positive direction and in negative direction respectively, and the field strength H in the core A reaches the critical value $H_c$ earlier than it does in the core B. As soon as the core A starts changing its state, the impedance of the winding WA1 becomes comparatively high, with the result that the current in the series-combination is limited and cannot assume such a value that the field strength $H_c$ is exceeded in the core B. The changing over of the state of the core A is, as it were, helped by the prepolarization, whereas the changing over of the state of the core B is counteracted by the pre-polarization. On the next negative pulse n, the core A reassumes the state 0, whereas the core B remains in the state 1, since the pulse drives this core only further into the state of saturation; this process is repeated.

The trigger circuit arrangement can be caused to assume the state 1—1 for following the cycle B by applying a strong positive pulse to the control terminal SET. If the next pulse from the generator GR is positive, the trigger remains again in this state. Upon the next negative pulse n, the core B passes over to the state 0. Although this pulse also seeks to drive the core A to the state 0, the core A remains in the state 1, since the changing over of the core B is again promoted by the prepolarization of the core B, whereas the change over of the core A is counteracted, the winding WB1 having a high impedance on changing over of the core B. During the cycle B comparatively strong pulses appear at the output terminal UB, whereas during the cycle A the pulses at the terminal UB have a negligible value. If desired, pulses may be derived from an auxiliary winding on the core A during the cycle A. The generator GR is adapted to be temporarily disconnected by closing the contact CS with the result that the negative pulses, which appear at SS when the core A passes over to the state 0 or the core B passes over to the state 1, are applied to the gate circuit PS through the rectifier G3 and the contact CS so that the latter is blocked. When the generator GR is again connected the trigger circuit will again follow the preceding cycle regardless of the polarity of the first pulse from the generator GR.

What is claimed is:

1. A magnetic trigger circuit arrangement comprising a first core and a second core each composed of a magnetic material having a substantially rectangular hysteresis loop, a first series combination of two windings coupled to said first and second cores respectively, a second series combination of two windings coupled to said second and first cores respectively, the impedance of the first series combination being substantially determined by the winding of the first series combination coupled to said first core, the impedance of the second series combination being substantially determined by the winding of the second series combination coupled to said second core, means for alternately producing voltage pulses of opposite polarity having an amplitude sufficient to change the remanence condition of a core and applying said pulses to said series combinations, means for causing said cores to assume a unidirectional initial magnetic state, a predetermined one of said cores continuously traversing alternate conditions of remanence in response to said pulses of opposite polarity, said one core being determined by the initial magnetic state and by the impedance-determining winding of said series combinations, and output means connected to said circuit, said output means assuming a distinctive state dependent on the core traversing alternate conditions of remanence.

2. A trigger circuit arrangement according to claim 1, wherein the pulses of opposite polarity are applied to a single series-combination of two windings, the number of turns of the windings being substantially equal, and means to prepolarize said cores in opposite directions at a field-strength lower than the critical field strength necessary to change-over a core from one remanence condition to another.

3. A trigger circuit arrangement according to claim 2, further comprising means for interrupting the supply of pulses when the cores assume a unidirectional magnetic state.

4. A magnetic trigger circuit arrangement comprising a first core and a second core each composed of a magnetic material having a substantially rectangular hysteresis loop, a first series combination of two windings coupled to said first and second cores respectively, a second series combination of two windings coupled to said second and first cores respectively, the impedance of the first series combination being substantially determined by the winding of the first series combination coupled to said first core, the impedance of the second series combination being substantially determined by the winding of the second series combination coupled to said second core, means for alternately producing voltage pulses of opposite polarity having an amplitude sufficient to change the remanence condition of a core and applying said pulses to said series combinations, pulses of one polarity being applied to said first series combination, pulses of the opposite polarity being applied to said second series combination, a predetermined one of said cores continuously traversing alternate conditions of remanence in response to said pulses of opposite polarity, said one core being determined by the initial magnetic state and by the impedance-determining winding of said series combination, means for causing said cores to assume a unidirectional initial magnetic state, and output means connected to said circuit, said output means assuming a distinctive state dependent on the initial magnetic state of said magnetic cores.

5. A trigger circuit arrangement according to claim 4, wherein the number of turns of the winding on the first core in the first series combination exceeds those of the winding on the second core and the number of turns of the winding on the second core in the second series combination exceeds those of the winding on the first core.

6. A trigger circuit arrangement according to claim 4, wherein one of said windings is common to said first and second series combinations, the number of turns of said common winding exceeding those of the winding on the other core in one series combination and being smaller than those of the winding on the other core in the other series combination.

7. A magnetic trigger circuit arrangement comprising a first core and a second core each composed of a magnetic material having a substantially rectangular hysteresis loop, a first series combination of two windings coupled to said first and second cores respectively, a second series combination of two windings coupled to said second and first cores respectively, the impedance of the first series combination being substantially determined by the winding of the first series combination coupled to said first core, the impedance of the second series combination being substantially determined by the winding of the second series combination coupled to said second core, means for alternately producing voltage pulses of opposite polarity having an amplitude sufficient to change the remanence condition of a core and applying said pulses to said series combinations, pulses of one polarity being applied to said first series combination, pulses of the opposite polarity being applied to said second series combination, a predetermined one of said cores continuously traversing alternate conditions of remanence in response to said pulses of opposite polarity, said one core being determined by the initial magnetic state and by the impedance-determining winding of said series combination, means for causing said cores to assume a unidirectional initial magnetic state, output means connected to said circuit, said output means assuming a distinctive state dependent on the initial magnetic state of said magnetic cores, and means for interrupting the supply of pulses when the cores assume a unidirectional magnetic state.

8. A trigger circuit arrangement according to claim 5, further including means for interrupting the supply of pulses when the cores assume a unidirectional magnetic state.

9. A trigger circuit arrangement according to claim 6, further including means for interrupting the supply of pulses when the cores assume a unidirectional magnetic state.

References Cited in the file of this patent

UNITED STATES PATENTS

| | | |
|---|---|---|
| 2,259,647 | Logan | Oct. 21, 1941 |
| 2,695,993 | Haynes | Nov. 30, 1954 |